United States Patent
Goltzman et al.

(10) Patent No.: US 9,614,781 B1
(45) Date of Patent: Apr. 4, 2017

(54) DATA DEFINED INFRASTRUCTURE

(71) Applicant: Accenture Global Solutions Limited, Dublin (IE)

(72) Inventors: Aaron B. Goltzman, Chesterfield, MO (US); Stefan C. Hellstrom, Denver, CO (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/201,770

(22) Filed: Jul. 5, 2016

Related U.S. Application Data

(60) Provisional application No. 62/302,007, filed on Mar. 1, 2016.

(51) Int. Cl.
| | |
|---|---|
| *G06Q 10/06* | (2012.01) |
| *H04L 12/911* | (2013.01) |
| *H04L 29/08* | (2006.01) |
| *G06F 9/44* | (2006.01) |
| *G06F 9/46* | (2006.01) |

(52) U.S. Cl.
CPC .............. *H04L 47/78* (2013.01); *G06F 9/44* (2013.01); *G06F 9/46* (2013.01); *G06F 9/463* (2013.01); *G06Q 10/06312* (2013.01); *H04L 67/10* (2013.01); *H04L 67/2852* (2013.01)

(58) Field of Classification Search
CPC ......... G06F 17/30539; G06F 17/30911; G06F 3/0482; G06F 8/36; G06F 8/41; G06F 8/60; G06F 9/45558; G06F 9/4843; G06F 9/4881; G06F 9/44; G06F 9/46; G06F 9/463; G06Q 10/06; G06Q 10/10; G06Q 10/06312; H04L 67/10
See application file for complete search history.

(56) References Cited

U.S. PATENT DOCUMENTS

| | | | |
|---|---|---|---|
| 2003/0115025 A1* | 6/2003 | Lee ........................... | G06F 8/36 703/1 |
| 2009/0132285 A1* | 5/2009 | Jakobovits ............ | G06F 3/0482 705/3 |
| 2009/0307187 A1* | 12/2009 | Averbuch .......... | G06F 17/30911 |
| 2010/0242013 A1* | 9/2010 | Hao ...................... | G06Q 10/10 717/102 |
| 2012/0110572 A1* | 5/2012 | Kodi .................... | G06F 9/45558 718/1 |

(Continued)

*Primary Examiner* — Le H Luu
(74) *Attorney, Agent, or Firm* — Brinks Gilson & Lione

(57) ABSTRACT

A system for managing the operation of different components within a cloud system to accomplish various tasks, including the implementation of build features within the cloud system to achieve specific operational goals. The system may include a data defined infrastructure (DDI) tool installed within a data defined infrastructure (DDI) to manage certain features or tasks within the cloud system. The DDI may include an environment configuration database (ECDB), an orchestration engine, an automation engine, and/or other hardware and software components within the cloud system, such that the DDI tool installed on the DDI infrastructure may control operation of the ECDB, the orchestration engine, the automation engine, or other hardware and software components within the cloud system based on a set of data that fully describes the operational goal.

20 Claims, 17 Drawing Sheets

(56) References Cited

U.S. PATENT DOCUMENTS

| | | | |
|---|---|---|---|
| 2012/0324455 A1* | 12/2012 | Zheng | G06F 17/30539 |
| | | | 718/102 |
| 2013/0067476 A1* | 3/2013 | Rosenberg | G06F 9/4843 |
| | | | 718/100 |
| 2014/0181803 A1* | 6/2014 | Cooper | G06F 8/60 |
| | | | 717/178 |
| 2015/0067687 A1* | 3/2015 | Turner | G06F 9/4881 |
| | | | 718/102 |
| 2015/0169500 A1* | 6/2015 | Balinsky | G06Q 10/06 |
| | | | 715/209 |
| 2016/0019056 A1* | 1/2016 | Rohan | G06F 8/41 |
| | | | 717/123 |

\* cited by examiner

Environment

| | |
|---|---|
| EnvironmentName | varchar2(64) |
| EnvironmentDesignator | varchar2(2) |
| EnvironmentPurpose | varchar2(64) |

Component_Group

| | |
|---|---|
| EnvironementName | varchar2(64) |
| ComponentGroupName | varchar2(64) |
| ComponentGroupDesignator | varchar2(24) |
| BuildOrder | int |

Component

| | |
|---|---|
| ComponentName | varchar2(64) |
| ComponentGroupName | varchar2(64) |
| BuildOrder | int |

File_System

| | |
|---|---|
| FileSystemName | varchar2(64) |
| VolumeName | varchar2(64) |
| MountPoint | varchar2(64) |
| FileSystemSize | int |

Figure 13

| VM_Requirement_xRef | |
|---|---|
| ComponentName | varchar2(64) |
| EnvironmentName | varchar2(64) |
| VMQuantity | int |
| NetworkTier | varchar2(64) |
| Parallel | varchar2(1) |
| CPU | int |
| Memory_GB | int |
| TemplateName | varchar2(64) |
| SharedDisk | int |
| VMDesignator | varchar2(3) |

| VMStorage | |
|---|---|
| ComponentName | varchar2(64) |
| EnvironmentName | varchar2(64) |
| VolumeName | varchar2(64) |
| VolumeSize_GB | int |
| SharedDisk | int |
| SharedDiskName | varchar2(64) |
| SCSI | varchar2(8) |

| Component_Install | |
|---|---|
| ComponentName | varchar2(64) |
| InstallItem | varchar2(64) |
| ComponentType | varchar2(64) |
| RunAs | varchar2(64) |
| TimeOut | int |
| BuildOrder | int |
| Params | varchar2(750) |

| NIC | |
|---|---|
| ComponentName | varchar2(64) |
| EnvironmentName | varchar2(64) |
| NICName | varchar2(64) |
| IPAddress | varchar2(64) |
| GatewayIP | varchar2(64) |

Figure 14

| Component_Parameter | |
|---|---|
| ComponentName | varchar2(64) |
| InstallItem | varchar2(64) |
| ParameterName | varchar2(64) |
| ParamenterType | varchar2(64) |
| ParameterValue | varchar2(64) |

Figure 15

Asset

| Environment_Asset | |
|---|---|
| EnvironmentName | varchar2(64) |
| vSwitchUUID | varchar2(64) |

| VM | |
|---|---|
| VMUUID | varchar2(64) |
| VMName | varchar2(15) |
| NetworkTier | varchar2(64) |
| CPU | int |
| Memory_GB | int |

| Switch | |
|---|---|
| vSwitchUUID | varchar2(64) |
| vSwitchName | varchar2(64) |

| Networks | |
|---|---|
| NetworkUUID | varchar2(64) |
| vSwitchUUID | varchar2(64) |
| NetworkName | varchar2(64) |
| GatewayAddress | varchar2(64) |
| NetworkSize_Subnet | varchar2(64) |

| VMStorage_Asset | |
|---|---|
| VolumeName | varchar2(64) |
| VMUUID | varchar2(64) |
| VolumeSize_GB | int |

| NIC_Asset | |
|---|---|
| NICName | varchar2(64) |
| NetworkUUID | varchar2(64) |
| IP_Address | varchar2(64) |
| Gateway_IP | varchar2(64) |
| VMUUID | varchar2(64) |

| File_System_Asset | |
|---|---|
| FileSystemName | varchar2(64) |
| VolumeName | varchar2(64) |
| MountPoint | varchar2(64) |
| FileSystemSize_GB | int |

Figure 16

IPAM

| IP_Pool | |
|---|---|
| IPAddress | varchar2(64) |
| NetworkTier | varchar2(64) |
| EnvironmentName | varchar2(64) |
| Status | varchar2(64) |
| VMUUID | varchar2(64) |

| Network_Pool | |
|---|---|
| NetworkTier | varchar2(64) |
| EnvironmentName | varchar2(64) |
| GatewayIP | varchar2(64) |
| SubnetMask | varchar2(64) |

Figure 17

DATA DEFINED INFRASTRUCTURE

CROSS-REFERENCE TO RELATED APPLICATIONS

This application claims the benefit of U.S. Provisional Patent Application No. 62/302,007, filed Mar. 1, 2016, the entirety of which is hereby incorporated by reference herein.

TECHNICAL FIELD

The processing power, memory capacity, network connectivity and bandwidth, and other resources available to computing systems have increased exponentially. This growth in resources has helped to drive extensive deployment of computing assets. Accompanying the deployments are difficult technical challenges in establishing, configuring, and maintaining the computing assets. This application relates to a data defined infrastructure within a computing system that includes technical components for running a self-sufficient workflow configured to build a virtual environment where operational processes may be implemented. The capabilities of the data defined infrastructure may be implemented within cloud-based systems (public, private, and/or hybrid), or within private infrastructures, as well as on both virtual and physical (non-virtual) components of a computing system.

BRIEF DESCRIPTION OF THE DRAWINGS

FIG. 13 shows exemplary database tables and database formats for data stored within an environment configuration database.

FIG. 14 shows exemplary database tables and database formats for data stored within an environment configuration database.

FIG. 15 shows exemplary database tables and database formats for data stored within an environment configuration database.

FIG. 16 shows exemplary database tables and database formats for data stored within an environment configuration database.

FIG. 17 shows exemplary database tables and database formats for data stored within an environment configuration database.

DETAILED DESCRIPTION

Figure 1:
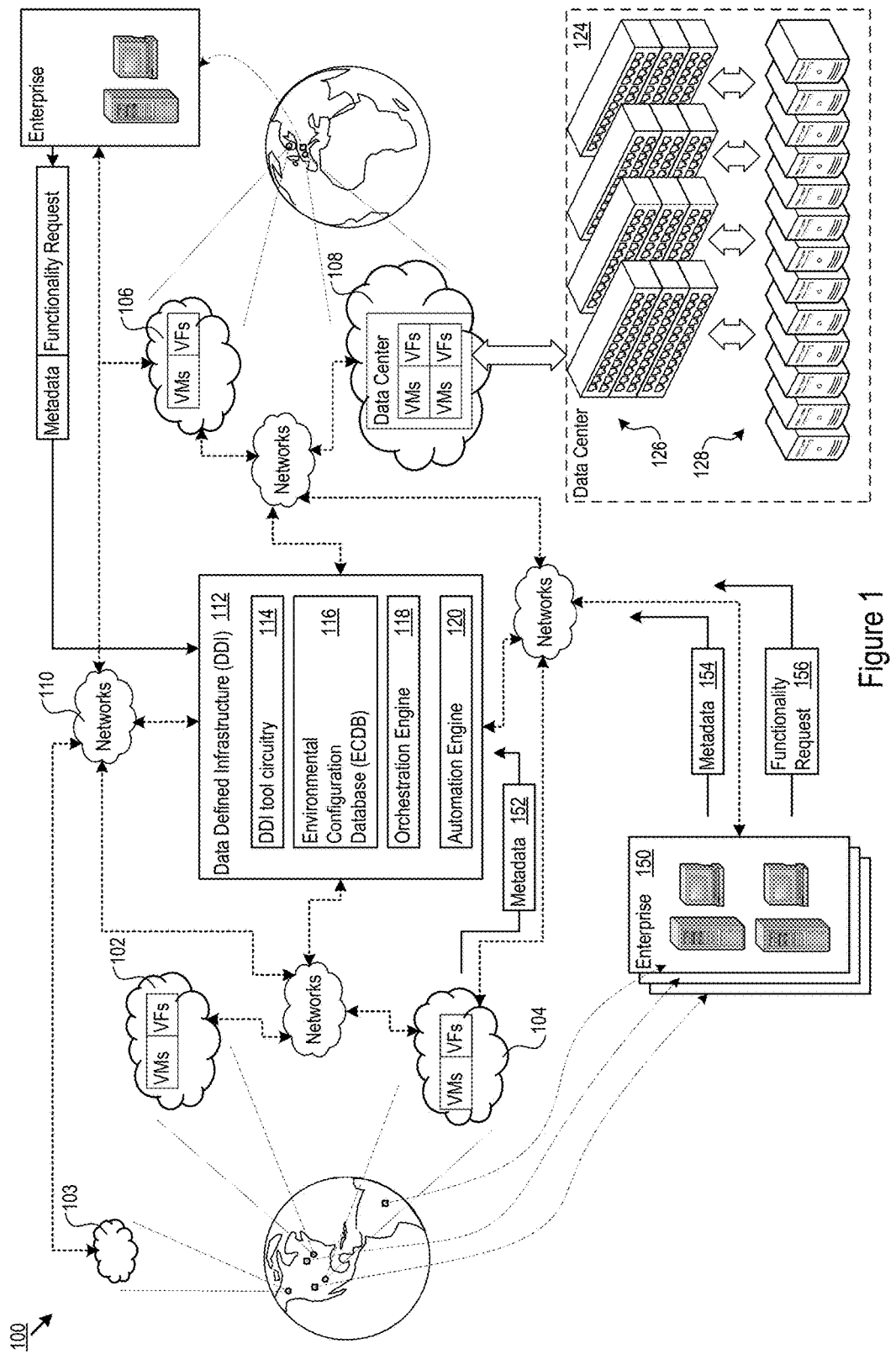
FIG. 1 shows exemplary global network architecture.

Computing resources have evolved to the point where a single physical server, or a family of physical servers, may host many instances of virtual machines and virtualized functions. These advances have led to the extensive provisioning of a wide spectrum of functionality for many types of entities into specific pockets of concentrated processing resources that may be located virtually anywhere, that is, relocated into a cloud of processing resources handling many different clients, hosted by many different service providers, in many different geographic locations. Improvements in cloud system control, deployment, and provisioning will drive the further development and implementation of functionality into various instantiations of cloud architectures.

One or more servers may be configured to manage the operation of different components within the cloud system to accomplish various tasks, including the implementation of build features within the cloud system to achieve specific enterprise goals. For instance, a data defined infrastructure (DDI) tool may be installed within a data defined infrastructure (DDI) to manage certain features or tasks within the cloud system. The DDI may include an environment configuration database (ECDB), an orchestration engine, an automation engine, and/or other hardware and software components within the cloud system, such that the DDI tool installed on the DDI infrastructure may control operation of the ECDB, the orchestration engine, the automation engine, and/or other hardware and software components within the cloud system.

The DDI tool may control the different components of the DDI to, for example, define relationships between components of the DDI and/or components of the cloud system at large. The DDI tool may also control the different components of the DDI to implement various services (e.g., business services) within the cloud system. For example, a wrapping workflow may be created as part of the DDI tool, where the wrapping workflow may be read by the orchestration engine to process data received from the ECDB to recognize an operational goal from the data received from the ECDB. By recognizing the operational goal from the data received from the ECDB, the orchestration engine may then gather data, and control a virtual build of operational tools and operational blocks within the cloud system for achievement of the recognized operational goal without the requirement that the orchestration engine or flow be specifically created to perform that goal. The orchestration engine may further call on the automation engine, as well as other hardware and software components within the cloud system, to self-sufficiently build/create the operational tools and operational blocks that are required to achieve the recognized operational goal.

The data stored on the ECDB may, for example, be a request to build a virtual email server network. According to such embodiments, the wrapping workflow component of the DDI tool may receive the request as defined within the ECDB, and recognize the operational goal as building the virtual email server network. To achieve the recognized operational goal of building the virtual email server network, the wrapping workflow component of the DDI may proceed to call on the different hardware and software components available within the cloud system, including the automation engine that is part of the DDI, to build the requested virtual email server network within the cloud system virtual environment.

As part of the wrapping workflow being processed by the orchestrator, one or more automation engines may be utilized to automatically implement certain predefined build features called for by the data received from the ECDB. The wrapping workflow may continue to run through iterations as long as the data received from the ECDB calls for additional iterations to achieve the recognized operational goal. Each iteration of the wrapping workflow may include one or more instructions for calling one or more cloud systems or infrastructure components to implement a specific build feature, gather data, or write data. Cumulatively, the instructions that are enacted by the iterations may control cloud system components to achieve the recognized operational goal. It follows that the described DDI tool may automatically align a business customer's needs with respect to an application running within the cloud system by automatically orchestrating the relationships between the applications, data, and infrastructure included within the cloud system to achieve recognized operational goals.

The DDI tool provides environment automation that is driven and defined by data, and in particular, driven and defined by data stored and received from the ECDB. The DDI tool allows for data to be the driver for differentiating a simple build of one system or an entire deployment of a large scale multi-tiered enterprise system. In some embodiments, the data may even be the sole driver for differentiating a simple build of one system or an entire deployment of a large scale multi-tiered enterprise system. The DDI tool builds upon and further abstracts software defined infrastructure (SDI) to provide rigor, repeatability, and reduced risk to stand-up of infrastructures.

The DDI tool also offers key benefits of build speed and efficiency based on the dynamic adaptability and automation attributes of the wrapping workflow. For instance, the wrapping workflow may be configured to receive data from the ECDB that calls for a number of different build requirements within the cloud system, and the wrapping workflow may be adaptable enough to have access to a wide array of predefined sub-workflow routines for achieving the different build requirements. The automation aspect of the wrapping workflow reduces user errors that may have occurred with human cloud system administrators. The wrapping workflow's reliability also allows the DDI tool repeat builds in a like or same manner without additional resources required in the same or different cloud infrastructure. The repeatability of the wrapping workflow also allows for easier auditing of past processes implemented by the DDI tool, as well as allows for the easy identification of system build versioning.

The DDI tool may be configured to operate according to a number of core concepts. For example, the DDI tool may be configured to keep all of the build instructions in the data received from the ECDB, maintain a plug and play architecture, keep orchestration flows (e.g., the wrapping workflow) as generic as possible to maintain flexibility for receiving different types of data calling for the orchestration flow to implement different tasks, keep automation scripts/policies/configurations as generic as possible, keep parameters in the data, and/or agnostic to the orchestration and/or automation engines as well as to the underlying visualization infrastructure.

The described automation may be performed on a virtual machine, server, or operating system (OS) that entail configuration of the cloud system operation system, installation of patches to applications running within the cloud system, installation of software within the cloud system, and configuration of software within the cloud system. The described orchestration may relate to the control of workflow (e.g., the wrapping workflow and resulting iterative sub-workflows) of activities based on the data provided. The orchestration also creates the linkages between the various components (virtualization, networking, OS) of the cloud system infrastructure.

Figure 2:
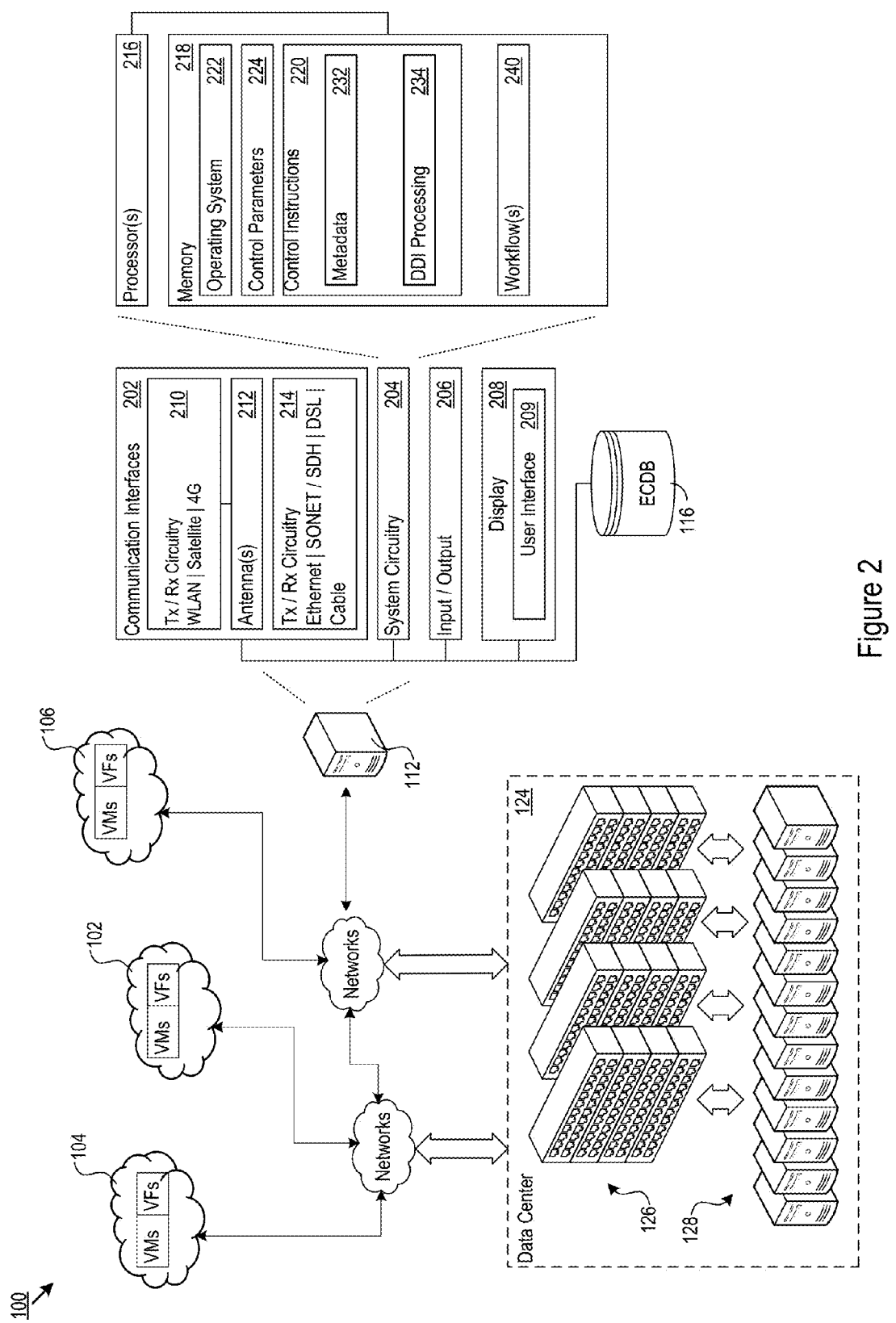
FIG. 2 shows an exemplary implementation of a data defined infrastructure within the global network architecture.

FIGS. 1 and 2 provide an exemplary context for the discussion of technical solutions for complex cloud architecture control and provisioning described in detail below. The examples in FIGS. 1 and 2 show one of many possible different implementation contexts. In that respect, the technical solutions are not limited in their application to the architectures and systems shown in FIGS. 1 and 2, but are applicable to many other cloud and fixed infrastructure computing implementations, architectures, and connectivity. Although the DDI is described within the context of being implemented on a cloud system, the same capabilities of the DDI may be applicable when implemented on private non-cloud infrastructures.

FIG. 1 illustrates a global network architecture 100. The global network architecture 100 may also be referred to as the cloud system at other parts of this disclosure. Distributed through the global network architecture 100 are cloud computing service providers, e.g., the service providers 102, 103, 104, 106, and 108. The service providers may be located in any geographic region, e.g., United States (US) East, US West, or Central Europe. The geographic regions that characterize the service providers may be defined according to any desired distinctions to be made with respect to location. A service provider may provide cloud computing infrastructure in multiple geographic locations for the global network architecture 100.

The service providers may provide computing resources via platforms that are generally publicly available. Service providers may additionally or alternatively provide computing resources "on-premises", which typically refers to a location with increased privacy and security compared to public cloud resources. An on-premise location may be within a secure facility owned by an enterprise which has moved computing functionality to a cloud based implementation, for instance. Examples of service providers include Amazon, Google, Microsoft, and Accenture, who offer, e.g., Amazon Web Services (AWS), Google Compute Engine (GCE), Microsoft Azure (Azure), Accenture Cloud Platform (ACP), and Windows Azure Pack (WAP) for on-premise cloud implementations, as just a few examples.

Throughout the global network architecture 100 are networks, e.g., the network 110, which provide connectivity within the service providers, and between the service providers and other entities within the global network architecture 100. The networks, including network 110, may include private and public networks defined over any pre-determined and possibly dynamic internet protocol (IP) address ranges. The data defined infrastructure (DDI) 112 included within the global network architecture 100, makes complex cloud architectural provisioning and execution decisions across multiple cloud services. The DDI takes into account the global network architecture 100, the various service provider locations and capabilities, and other factors when operating to achieve the recognized operational goals, as described in more detail below.

As an overview, the DDI 112 may include DDI tool circuitry 114 configured to include the hardware, software, firmware, and/or middleware for implementing the features accountable to the DDI as described herein. The DDI 112 also includes an environment configuration database (ECDB) 116. The ECDB 116 may include one or more storage units and processing components configured to receive data through the networks accessible within the global network architecture 100, and provide the stored data to an orchestration engine 118. The orchestration engine 118 may include the hardware, software, firmware, and/or middleware for running the wrapping workflow, where the wrapping workflow is configured to receive data from the ECDB 116, recognize an operation goal from the data, and control components from the global network architecture, including the DDI components, to achieve the recognized operational goal. The DDI 112 also includes an automation engine 120 configured to be controlled by the orchestration engine 118 to implement a number of predefined automatic builds of cloud system features as part of the process implemented by the wrapping workflow to achieve the recognized operational goal.

Exemplary operational goals may include system automation tasks within the global network architecture 100, such as, but not limited to: VMware NSX Network Configuration, Windows and Linux Operating System Deployment (VMware), Host configuration including firewalls and networking, Software installation (Oracle RAC, SQL Server, WAS, Custom), Automated system integration (Application server to database), Concurrent builds as driven by data, Build versioning across the entire DDI stack, and Hardening (DoD STIG) implementation.

The automation engine 120 may handle the interactions with virtual machines, physical servers, and/or Operating Systems (OS) within the global network architecture 100 once the automation engine 120 is under management by the orchestration engine 118. The automation engine 120 may further be enabled through a secure agent based tunnel to the host. The automation engine 120 may further provide audit capabilities and traceability for all actions performed on an OS. Attributes are applied to every build server within the global network architecture 100 as part of the handoff to the automation engine 120. These attributes will serve as the parameters that are fed into the various automation tasks that are run within the global network architecture 100, and in particular the DDI. The attributes may be stored as part of the metadata that describes the DDI. For example, the attributes may be stored in the ECDB 116, according to some embodiments.

The actions taken by the DDI 112 may be influenced by many technical factors, including metadata collected from various sources, including service provider metadata 152 that describes service provider offerings and capabilities, and enterprise metadata 154 that describes the cloud functionality requests 156 made to the DDI 112 by the enterprise 150, and the service requirements (e.g., PCI data compliance) for the functionality requests made by the enterprise 150. Each of the data, metadata, requirements, and requests received by the DDI 112 may be stored, at least in part, on the ECDB 116.

In its role as the architect for maintaining the global network architecture 100, the DDI 112, and in particular the wrapping workflow being run on the orchestration engine 118, analyzes cloud service requests and makes decisions about implementation and provisioning of the requested services. This technical role is a complex one, due in part to the disparate cloud computing services offered by each service provider. That is, each service provider has a widely varying set of technical characteristics.

For instance, FIG. 1 shows a particular data center 124 for the service provider 108 running many different virtual machines (VMs), each running many different virtual functions (VFs). The data center 124 may include a high density array of network devices, including routers and switches 126, and host servers 128. The host servers 128 support a unique set of computing functionality offered by the service provider 108 from the data center 124. As just one of many examples, the service provider 108, through the data center 124 and its other infrastructure, may support many different types of virtual machines, differing by number of processors, amount of RAM, and size of disk, graphics processors, encryption hardware, or other properties; multiple different types of web front ends (e.g., different types and functionality for websites); several different types of database solutions (e.g., SQL database platforms); secure data storage solutions, e.g., payment card industry (PCI) data (or any other secure data standard) compliant storage; several different types of application servers; and many different types of data tiers. Further, the service provider 108 and the data center 124 may have further characteristics for the DDI 112 to analyze, including whether the data center 124 is an on-premise or public location; which networks can provide connectivity to the data center 124; which assets the service provider 108 supports; and other characteristics.

FIG. 2 shows an exemplary implementation of the DDI 112 configured to execute complex cloud architectural provisioning and execution decisions across multiple cloud services. The DDI 112 includes communication interfaces 202, system circuitry 204, input/output interfaces 206, and a display 208 on which the DDI 112 generates a user interface 209.

The user interface 209 and the input/output interfaces 206 may include a graphical user interface (GUI), touch sensitive display, voice or facial recognition inputs, buttons, switches, speakers and other user interface elements. Additional examples of the input/output interfaces 206 include microphones, video and still image cameras, headset and microphone input/output jacks, Universal Serial Bus (USB) connectors, memory card slots, and other types of inputs. The input/output interfaces 206 may further include magnetic or optical media interfaces (e.g., a CDROM or DVD drive), serial and parallel bus interfaces, and keyboard and mouse interfaces. According to some embodiments, the user interface 209 may prompt a user (e.g., cloud system administrator) to input data into the ECDB 116. The user may then input data through the input/output interfaces 206 to be stored on the ECDB 116.

The communication interfaces 202 may include wireless transmitters and receivers ("transceivers") 210 and any antennas 212 used by the Tx/Rx circuitry of the transceivers 210. The transceivers 210 and antennas 212 may support WiFi network communications, for instance, under any version of IEEE 802.11, e.g., 802.11n or 802.11ac. The communication interfaces 202 may also include wireline transceivers 214. The transceivers 214 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include any combination of hardware, software, middleware, firmware, or other logic. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality in the DDI 112. As just one example, the system circuitry 204 may include one or more instruction processors 216 and memories 218. The memory 218 stores, for example, control instructions 220 and an operating system 222. The control instructions 220 may include, for example, a DDI processing block 234 that includes the instructions DDI (e.g., software) for operating the DDI as described herein. For example, the DDI processing block 234 may be representative of the DDI tool described herein. The processor 216 executes the control instructions 220 and the operating system 222 to carry out any desired functionality for the DDI 112. The control parameters 224 provide and specify configuration and operating options for the control instructions 220, operating system 222, and other functionality of the DDI 112. In particular, the memory 218 may store the instructions representative of workflows 240 run by the orchestration engine 118, e.g., as part of the DDI processing 234 or control instructions 220. In particular, the workflows 240 may be representative of the wrapping workflow, and any sub-workflows that are invoked based on subsequent iterations of the wrapping workflow, as described herein.

The DDI 112 also includes storage devices (e.g., hard disk drives (HDDs) and solid state disk drives (SDDs)). For instance, the storage devices may define and store databases that the control instructions 220 accesses, e.g., through a database control system, to perform the functionality implemented in the control instructions 220. In the example shown in FIG. 2, the databases include the ECDB 116. Each database in the system may define tables storing records that the control instructions 220 and DDI processing 234 read, write, delete, and modify to perform the processing noted below.

Figure 3:
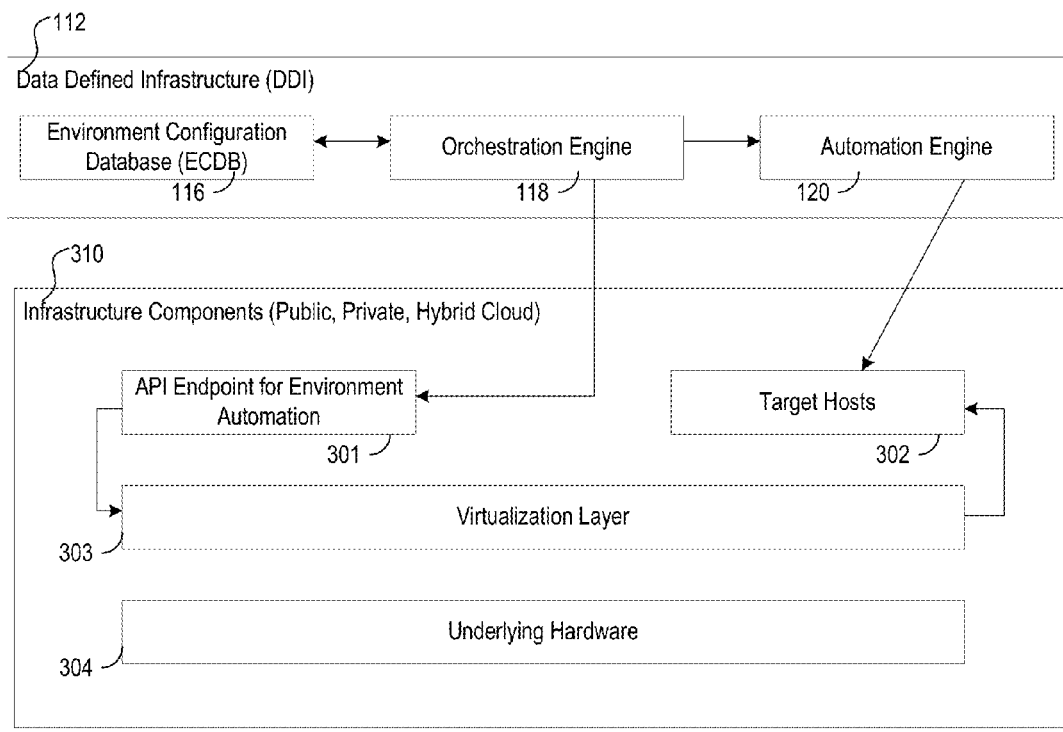
FIG. 3 shows a block diagram of the data defined infrastructure interacting with other components within the global network architecture.

FIG. 3 shows a block diagram 300 that describes an exemplary logic flow of the DDI 112 interacting with various components of the global network architecture 100. In particular, the DDI 112 may communicate with infrastructure components 310 that include any combination of public, private, and hybrid cloud system infrastructure components within the global network architecture 100. As shown, the DDI 112 may be comprised of the ECDB 116, the orchestration engine 118, and the automation engine 120.

The ECDB 116 may store data that is shared with the orchestration engine 118. The data stored within the ECDB 116 that completely describes the operational goal may be defined as the "application fingerprint". Based on receiving the application fingerprint from the ECDB 116, the orchestration engine 118 may recognize an operational goal. For example, the ECDB 116 may store a building sequence for building certain virtual components to achieve the operational goal, where the building sequence is retrieved from the ECDB 116 by the orchestration engine 118. The orchestration engine 118 may communicate with one or more components of the global network architecture 100 to achieve the recognized operational goal. In particular, FIG. 3 shows the orchestration engine 118 transmitting data, which may include build instructions, to an application program interface (API) endpoint for environment automation 301 running within the global network architecture 100. The API endpoint for environment automation 301 may then build a new virtual component within the virtualization layer based on the received data from the orchestration engine 118. The virtual component built within the virtualization layer 303 may, for example, be a virtual machine built for a specific purpose of achieving a recognized operational goal. After the build of the virtual component, the orchestration engine 118 may further generate a record of the application fingerprint describing the virtual component (e.g., data and metadata describing attributes of the virtual component) and/or the processes implemented during the build of the virtual component as a configuration item or items within a configuration management database (CMDB).

Similarly, the orchestration engine 118 may transmit data, which may include build instructions, to the automation engine 120. Based on receiving the data from the orchestration engine 118, the automation engine 120 may responsively transmit data, which may include build instructions, to the target hosts 302 running within the global network architecture 100. A component running within the virtualization layer 303 may contribute to data being transmitted to the target hosts 302. For example, a virtual machine running on the virtualization layer 303 may build a component, or create data, that will be transmitted to the target hosts 302.

The infrastructure components described in FIG. 3 may include underlying hardware 304 which will be running the described virtual components such as the virtualization layer, the API endpoint for environment automation 301 and the target hosts 302.

Figure 4:
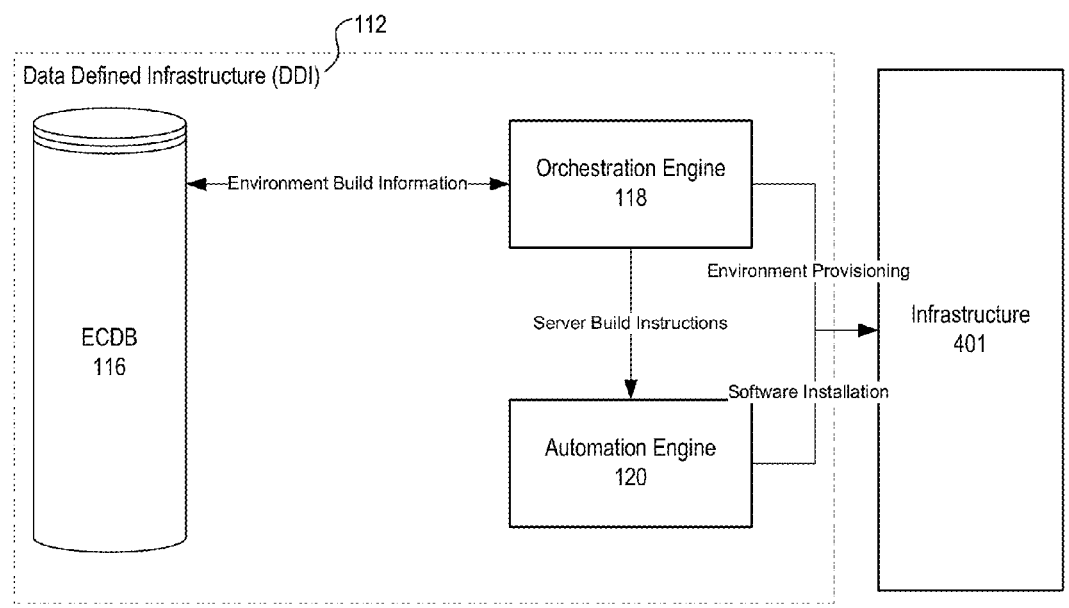
FIG. 4 shows a block diagram of the data defined infrastructure operating according to a logic flow within the global network architecture.

FIG. 4 illustrates a block diagram 400 that describes another exemplary wrapping workflow logic of the DDI 112 interacting with various components of the global network architecture 100. In particular, the DDI 112 may communicate with infrastructure 401 that include any combination of public, private, and hybrid cloud system infrastructure components within the global network architecture 100. As shown, the DDI 112 may be comprised of the ECDB 116, the orchestration engine 118, and the automation engine 120. The ECDB 116 may store data that is shared with the orchestration engine 118. Based on receiving data from the ECDB 116, the orchestration engine 118 may recognize an operational goal. The received data may include a building sequence for building certain virtual components to achieve the operational goal. The orchestration engine 118 may communicate with one or more components of the global network architecture 100 to achieve the operational goal. For example, the orchestration engine 118 may execute the wrapping workflow logic to build a specific environment "X". The execution of the wrapping workflow logic may then cause the orchestration engine 118 to query the ECDB 116 to figure out what component groups, virtual machines, or other components are needed to build this environment "X". Instead of a single query to the ECDB 116 at the beginning, rather, at each step of the process for building the environment "X", the wrapping workflow logic queries for the next set of information until there is no more data left in the ECDB 116 related to building the environment "X" (e.g., the wrapping workflow logic queries for the next virtual machine within a component, next component within a component group, or next component group within the environment until there is no more data left).

In particular, FIG. 4 shows the orchestration engine 118 transmitting data, which includes data describing environment provisioning, to the infrastructure 401. The orchestration engine 118 may also transmit server build instructions to the automation engine 120, based on receiving the data from the ECDB 116. The automation engine 120 may then transmit software installation instructions to the infrastructure 401 based on the received server build instructions.

The infrastructure 401 may include any combination of public, private, and hybrid cloud system infrastructure components within the global network architecture 100. Then based on the received environment provisioning data and the software installation instructions, which may be referenced as the "application fingerprint", the orchestration engine 118 may operate to build the components for achieving the recognized operational goal by executing the wrapping workflow logic. The recognized application fingerprint may describe, for example, the creation or modification of an environment within the infrastructure 401 such as a web service capability. Therefore, the recognized operational goal may be to build environment "Y" that will have various components that allow it to present a web application. The components might be a MySQL database, multiple JBOSS web application servers, and multiple Apache Tomcat web servers.

After building the environment according to the execution of the wrapping workflow logic, the orchestration engine 118 may further generate a record of the application fingerprint describing the built environment (e.g., data and metadata describing attributes of the virtual component) and/or the processes implemented during the build of the environment as a configuration item or items within a configuration management database (CMDB).

Figure 5:
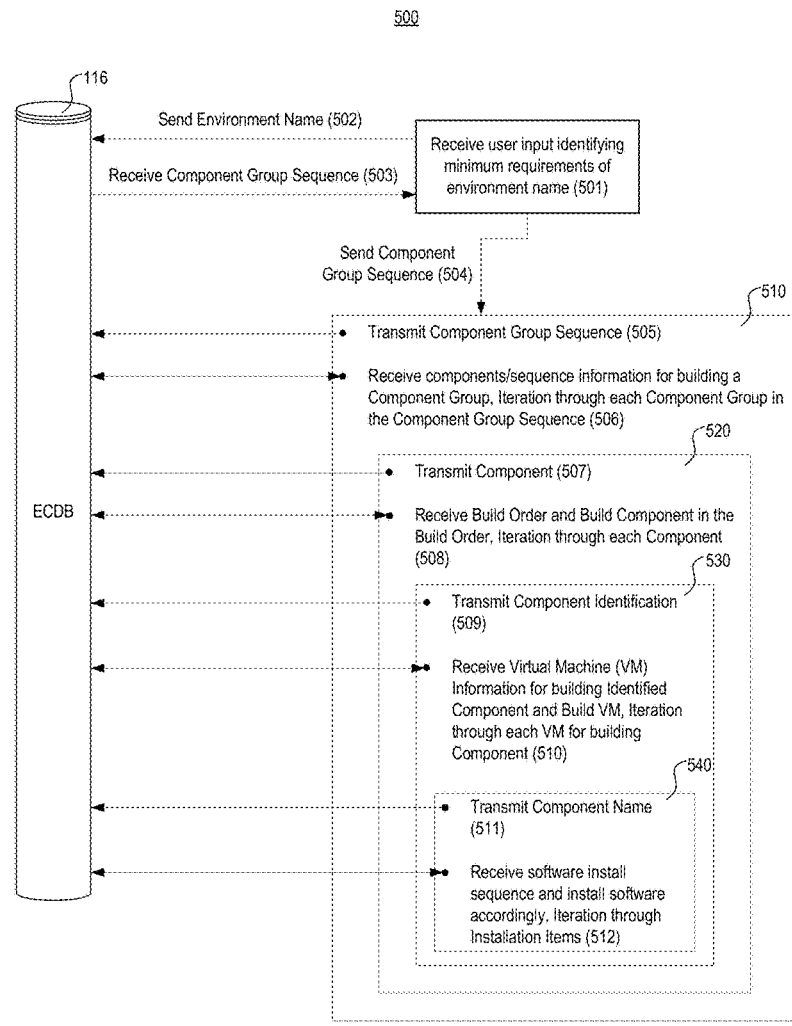
FIG. 5 shows a block diagram of the data defined infrastructure operating according to a logic flow within the global network architecture.

FIG. 5 illustrates a block diagram 500 that describes another exemplary wrapping workflow logic of the DDI 112 interacting with various components of the global network architecture 100. In particular, the DDI 112 may communicate with infrastructure components that include any combination of public, private, and hybrid cloud system infrastructure components within the global network architecture 100.

As shown in FIG. 5, a user input may be received that identifies an environment name and the minimum requirements for building an environment corresponding to the identified environment name (501). The user input may be received through the input/output interfaces 206 based on, according to some embodiments, a prompt or input field displayed through the user interface 209. Identification of the environment name may be understood as defining the environment for purposes of building the environment. For example, the environment may be a generic thick client presentation architecture. The environment name and corresponding details associated with the definition of that environment may be referenced as the "application fingerprint".

The environment name may be transmitted to the ECDB 116 (502). In response to receiving the environment name, the ECDB 116 may return a component group sequence to the orchestration engine 118 (501), which may represent a portion of the application fingerprint. The component group sequence may identify a component group, identify components that comprise the component group, and describe a sequence for building the components in the component group to achieve the recognized operational goal of building the environment. For example, when the environment is the generic thick client presentation architecture, the component groups identified from the component group sequence may include an Active Directory group (Component Group Build 1), an Application to be Presented group (Component Group Build 2), and a Citrix group (Component Group Build 3). Each component group may further be identified with a component group build order. For example, the Active Directory group may be identified as being built first (Component Group Build 1), then the Application to be Presented group may be identified as being build second (Component Group Build 2), and the Citrix group may be identified as being built third (Component Group Build 3). Further, within each component group, the components that comprise the component group may be identified, along with the build order for the components that comprise the component group, and, when available, a quantity of the components that are to be built for the environment. For example, the Active Directory group may be identified as including a primary active directory server (Component Build 1), and a Secondary Active Directory Server (Component Build 2). The Citrix group may be identified as including a Citrix XenApp License Server (Component Build 1), a Citrix XenApp Zone Data Collector (quantity 2) (Component Build 2), a Citrix XenApp StoreFront Web Server (quantity 2) (Component Build 3), and a Citrix XenApp Session Host (quantity N) (Component Build 4).

The component group sequence may have been inserted into the ECDB 116 as part of a preparation process defining the application fingerprint. In order to define the operational goal, the environment is described by the data stored in the ECDB 116. Additionally, an electronic catalog tool may be provided (e.g., an electronic service catalog) that allows a user to request an environment, and automate certain operational decisions for pre-populating data into the ECDB 116 based on the questions asked of the user and answers received from the user.

The wrapping workflow logic may query the ECDB 116 for the component group sequence, and in response, the ECDB 116 may transmit the component group sequence to a first infrastructure component 510 for further processing (504). For example, the query may be a standard query, such as an SQL query when the ECDB 116 is an Oracle database.

After receiving the component group sequence and completing the build of a component, data is transmitted back to the ECDB 116 as an asset/configuration management process (505). For example, in the process of building a virtual machine, an IP Address will be requested and reserved from an IP Address Management (IPAM) system. The IP address may be tied, via data, to that virtual machine within the ECDB 116. Then the IP address may be transmitted back to the ECDB 116 to be stored.

In response to receiving the component group sequence, the ECDB 116 may return components/sequence information for building a component group within the component group sequence (506). The first infrastructure component 510 and the ECDB 116 may communicate back and forth through as many iterations as needed to receive components/sequence information from the ECDB 116 for each component within the component group sequence (506).

After running through the iterations on the first infrastructure component 510, a second infrastructure component 520 may transmit component information to the ECDB 116, where the component information corresponds to a component within the component group sequence (507). In response to receiving the component information from the second infrastructure component 520, the ECDB 116 may return a build order including instructions for building the component identified by the component information to the second infrastructure component 520 (508). The second infrastructure component 520 may then build the component according to the received build instructions (508). The second infrastructure component 520 and the ECDB 116 may communicate back and forth through as many iterations as needed to receive build order information from the ECDB 116 for each component within the component group sequence (508).

A third infrastructure component 530 may also transmit component information to the ECDB 116, where the component information corresponds to a component within the component group sequence (509). In response to receiving the component information from the third infrastructure component 530, the ECDB 116 may return virtual machine (VM) information including instructions for building the component identified by the component information to the third infrastructure component 530 (510). The third infrastructure component 530 may then build the virtual machine according to the received VM information (510). The VM may be configured to perform a specific task for achieving the recognized operational goal. The third infrastructure component 530 and the ECDB 116 may communicate back and forth through as many iterations to receive VM information from the ECDB 116 for each VM that is needed to achieve the recognized operational goal as managed by the orchestration engine 118.

A fourth infrastructure component 540 may also transmit component information to the ECDB 116, where the component information corresponds to a component within the component group sequence (511). In response to receiving the component information from the fourth infrastructure component 540, the ECDB 116 may return software install sequence information including instructions for installing software (512). The fourth infrastructure component 540 may then install the software according to the software install sequence information (512). The software may be configured to perform a specific task for achieving the recognized operational goal. The fourth infrastructure component 540 and the ECDB 116 may communicate back and forth through one or more iterations to receive software install sequence information from the ECDB 116 for each software that is needed to be installed to achieve the recognized operational goal as managed by the orchestration engine 118.

After building the environment according to the execution of the wrapping workflow logic described in block diagram 500, the orchestration engine 118 may further generate a record of the application fingerprint describing the built environment (e.g., data and metadata describing attributes of the virtual component) and/or the processes implemented during the build of the environment as a configuration item or items within a configuration management database (CMDB).

Although block diagram 500 as illustrated describes the exemplary wrapping workflow logic of the DDI 112 to iterate up to the fourth infrastructure component 540, the number of iterations of infrastructure components run by the wrapping workflow will depend on the data stored and retrieved from the ECDB 116. As long as the wrapping workflow retrieves data that define infrastructure components that call for additional iterations, the wrapping workflow may continue to run through additional iterations of retrieving data from the ECDB 116. It follows that a predetermined limit on the number of infrastructure components may not exist.

Figure 6:
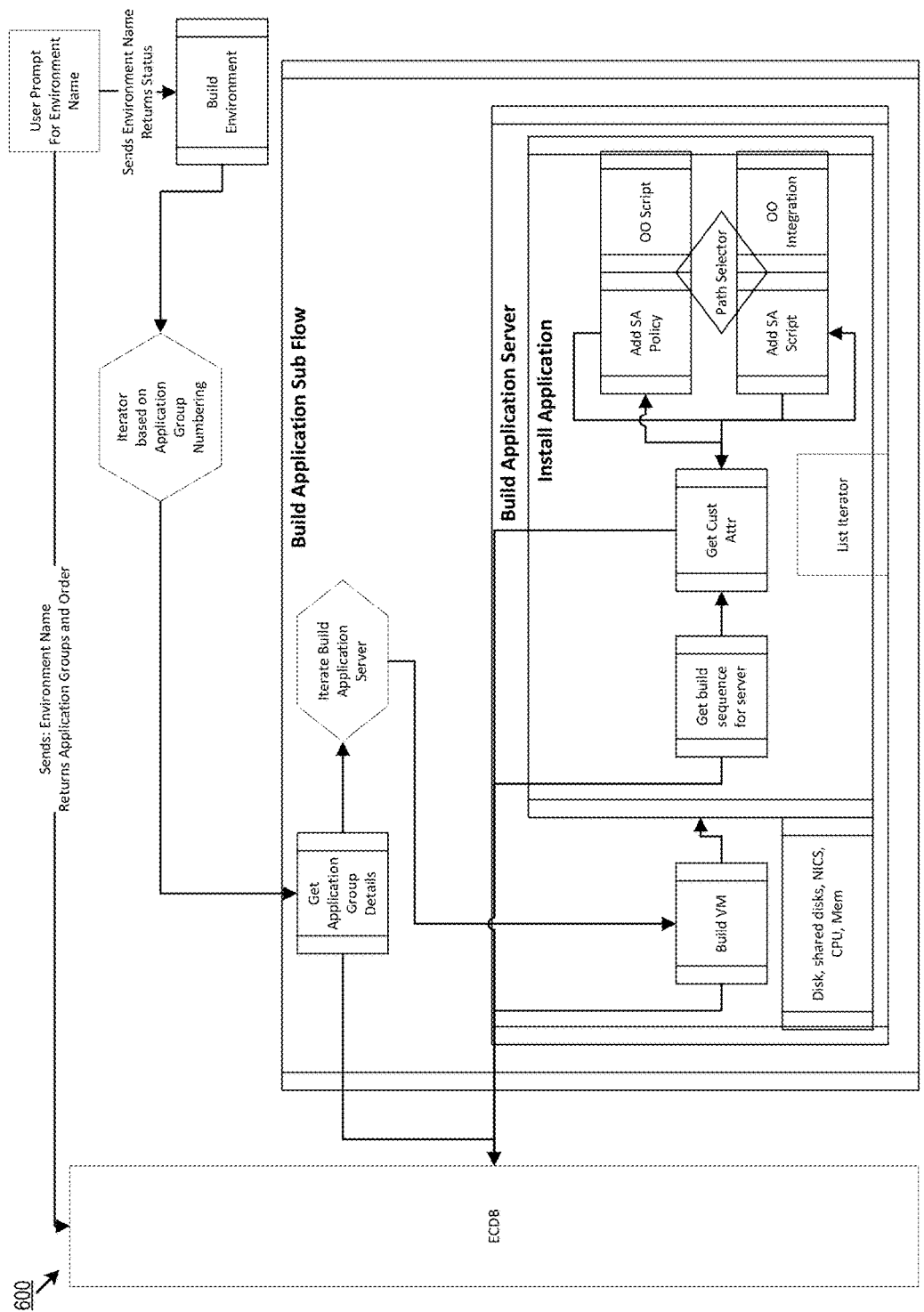
FIG. 6 shows a block diagram of the data defined infrastructure operating according to a logic flow within the global network architecture.

FIG. 6 illustrates a block diagram 600 that describes an exemplary wrapping workflow logic of the DDI 112 which reads the application fingerprint and, based on those instructions, interacts with various components of the global network architecture 100. After building an environment according to the execution of the wrapping workflow logic described in block diagram 600, the orchestration engine 118 may further generate a record of the application fingerprint describing the built environment (e.g., data and metadata describing attributes of the virtual component) and/or the processes implemented during the build of the environment as a configuration item or items within a configuration management database (CMDB). A more detailed description of the logic illustrated in FIG. 6 is provided by additional flow charts 700-1100 shown in FIGS. 7-11.

Figure 7:
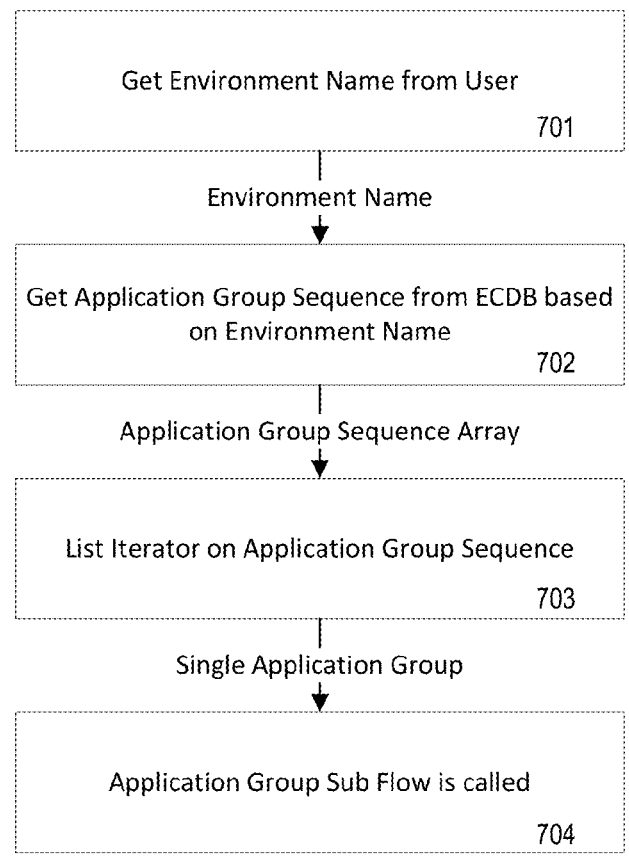
FIG. 7 shows a logical flow for an operational process of the data defined infrastructure shown in FIG. 6.

In FIG. 7, the wrapping workflow is shown operating according to a build event sub-workflow 700. Within the build event sub-workflow 700, the wrapping workflow obtains an environment name from a user, and sending the environment name to the ECDB 116 (701).

In response to receiving the environment name, the ECDB 116 may return an application group sequence based on the environment name (702), which may represent a portion of the application fingerprint. The application group sequence may be returned in an application group sequence array.

The wrapping workflow may apply a list iterator on the application group sequence (703). By doing so, the wrapping workflow may generate a single application group.

For each single application group that is iterated through during the build event sub-workflow 700, the wrapping workflow may call on a corresponding application group sub-workflow (704).

Figure 8:
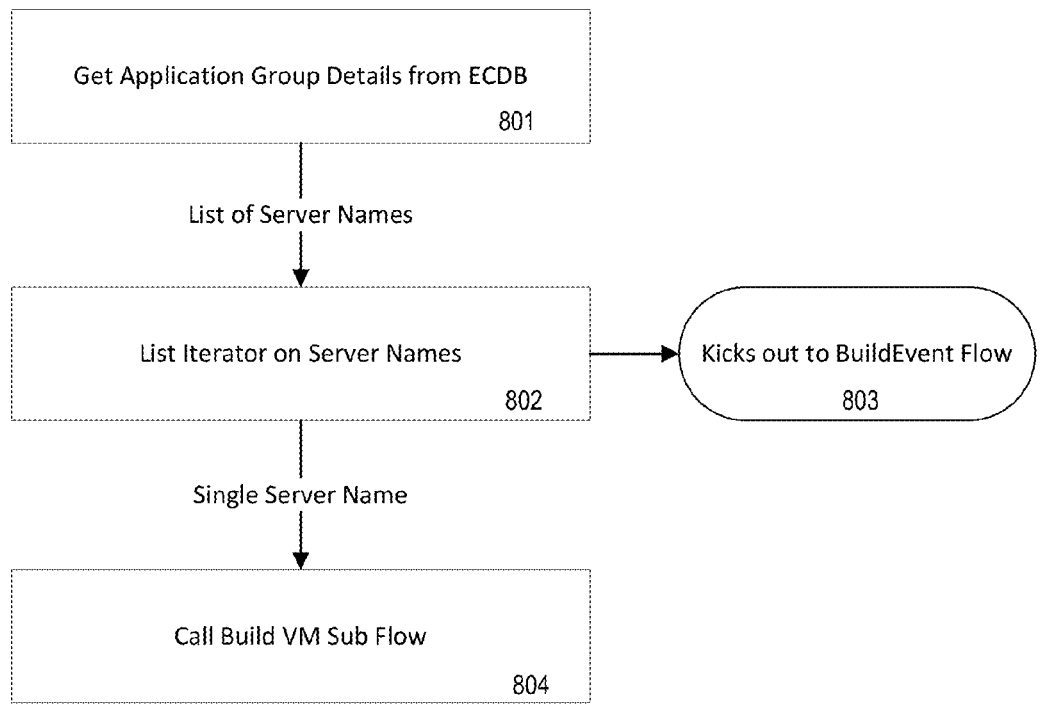
FIG. 8 shows a logical flow for an operational process of the data defined infrastructure shown in FIG. 6.

In FIG. 8, the wrapping workflow is shown operating according to an application group sub-workflow 800 corresponding to a current application group within the application fingerprint. The application group sub-workflow 800 may be, for example, the same as the application group sub-workflow described during the process at (704) show in FIG. 7. Within the application group sub-workflow 800, the wrapping workflow obtains application group details from the ECDB 116 that pertain to the current application group, and retrieves a list of server names from the ECDB 116 that may be utilized to build applications included in the current application group (801).

A list iterator may be applied on the list of server names (802), where for each server within the list of server names, the wrapping workflow may call back to a respective build event sub-workflow (803). Then for each server name within the list of server name, the wrapping workflow may call a build virtual machine sub-workflow for building the server (804).

Figure 9:
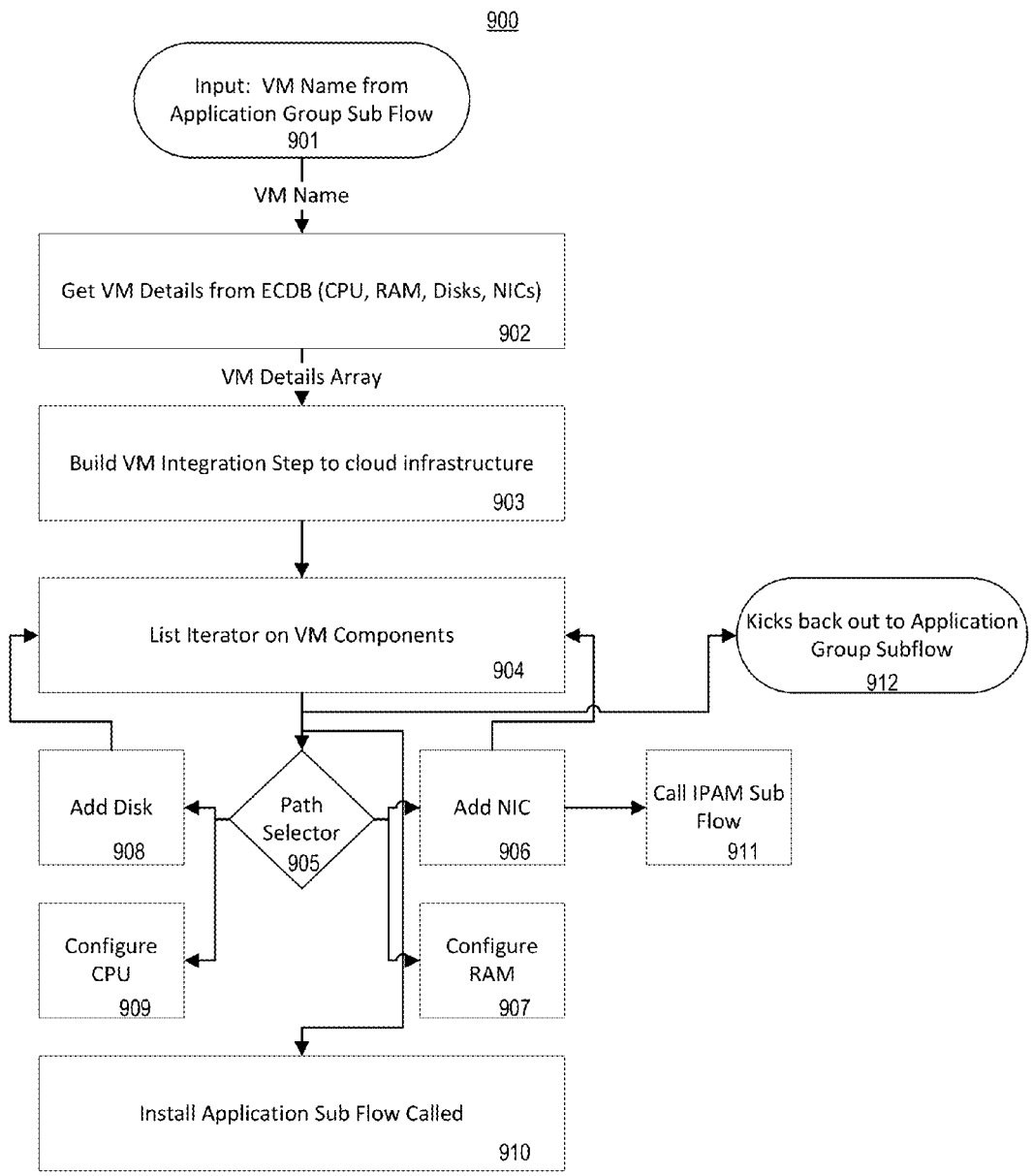
FIG. 9 shows a logical flow for an operational process of the data defined infrastructure shown in FIG. 6.

In FIG. 9, the wrapping workflow is shown operating according to a build virtual machine sub-workflow 900 corresponding to a current application. The build virtual machine sub-workflow 900 may be, for example, the same as the virtual machine sub-workflow described during the process at (804) show in FIG. 8. The initial input from the application group sub-workflow 800 may be a virtual machine name (901). With the virtual machine name, the wrapping workflow may retrieve virtual machine details from the ECDB 116 (902). The virtual machine details may be received from the ECDB 116 in a virtual machine details array data format.

Based on the information received in the virtual machine details array, the wrapping workflow may build the virtual machine (VM) Integration Step to Cloud Infrastructure (903).

Then a list iterator may be applied to run through each component that comprises the virtual machine for generating the current application (904). For example, a path selector may be referenced (905) to choose from an add disk building component (908), configure CPU building component (909), add NIC building component (906), and a configure RAM building component (907). The path selector (905) may also be used to call an install application sub-workflow (910). When the add NIC building component (906) is selected, the wrapping workflow may call to an IPAM sub-workflow (911). The wrapping workflow may also revert back to the application group sub-workflow when the list iterator has concluded iterating through the different components that comprise the virtual machine for the current application (912).

Figure 10:
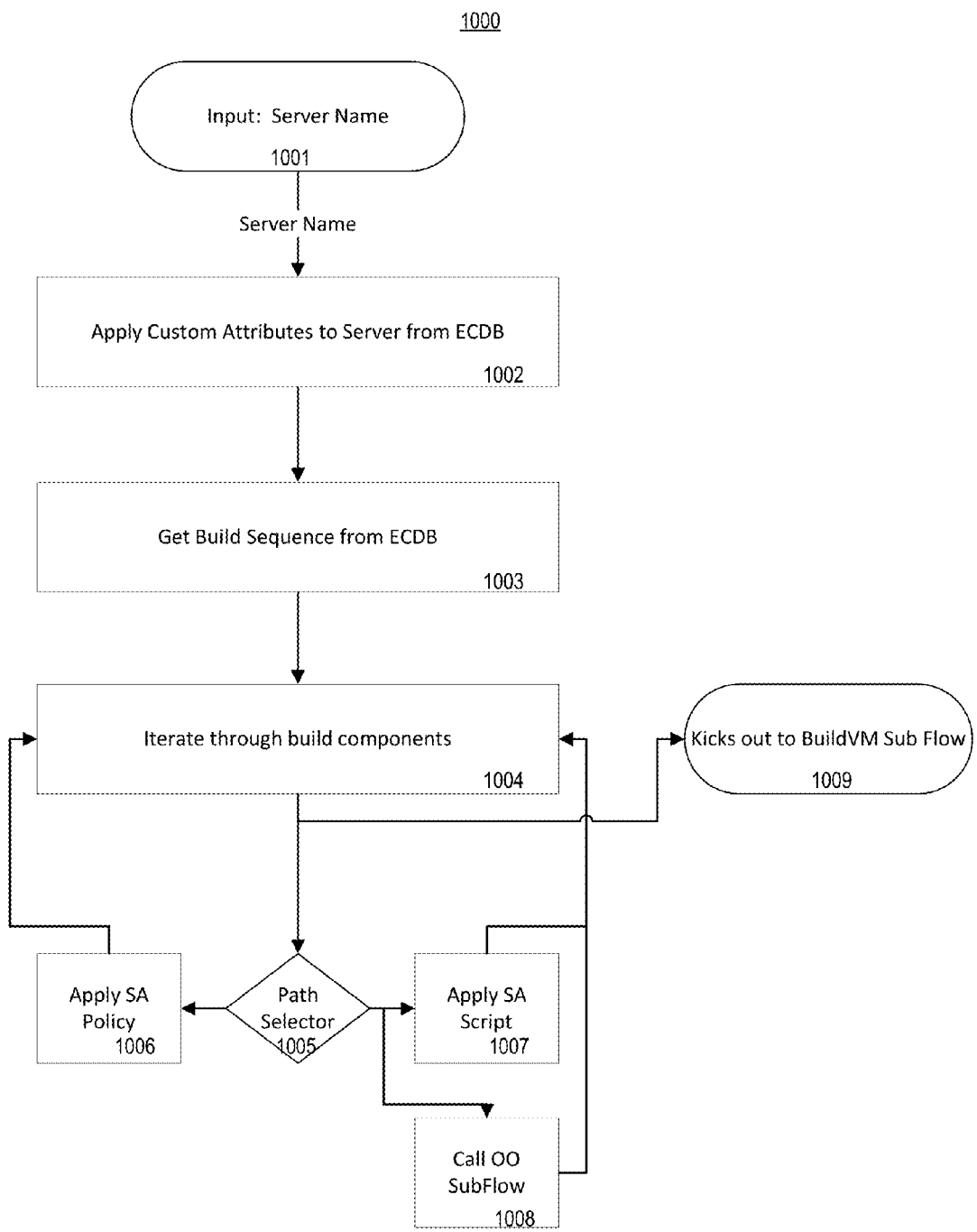
FIG. 10 shows a logical flow for an operational process of the data defined infrastructure shown in FIG. 6.

In FIG. 10, the wrapping workflow is shown operating according to an install application sub-workflow 1000 corresponding to a current server. The initial input from the build virtual machine sub-workflow 900 may be the name for the current server (1001).

Custom attributes for the current server may be retrieved from the ECDB 116 based on the server name so that the custom attributes may be applied when building the current server (1002).

A build sequence for building the current server may be retrieved from the ECDB 116 (1003).

The wrapping workflow may iterate through each of the steps in the build sequence to build each component that comprises the current server (1004). A path selector may be applied (1005) to select from an apply SA policy building component (1006), and an apply SA script building component (1007). The path selector may also call the OO sub-workflow as needed (1008). The path selector may also revert to calling back to the build virtual machine sub-workflow 900 when each of the components that comprise the server have been iterated through (1009).

Figure 11:
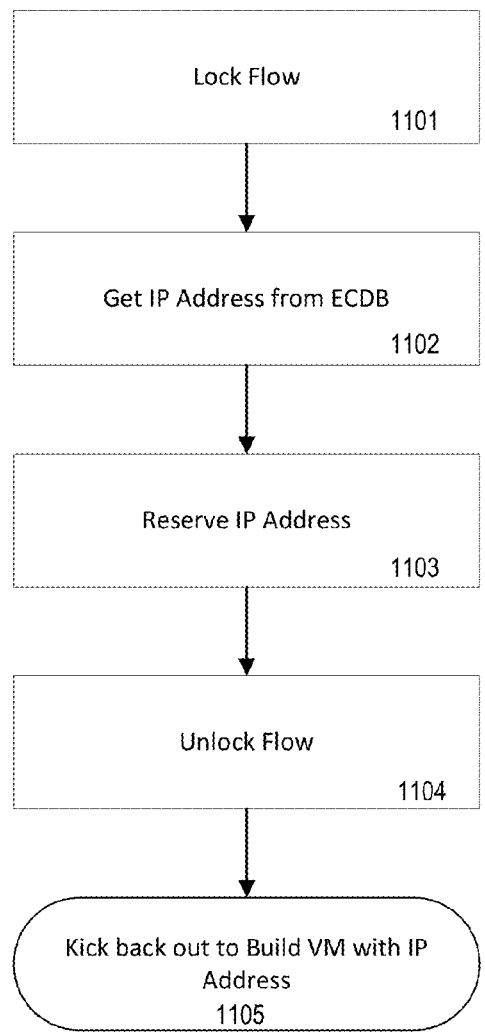
FIG. 11 shows a logical flow for an operational process of the data defined infrastructure shown in FIG. 6.

In FIG. 11, the wrapping workflow is shown operating according to an (IP address management (IPAM) sub-workflow 1100.

Within the IPAM sub-workflow 1100, the wrapping workflow may control operations within the DDI and/or other infrastructure within the global network architecture 100 to lock flow (1101), obtain an IP address from the ECDB 116 (1102), reserve the IP address obtained from the ECDB 116 (1103), unlock flow (1104), and call back to the build virtual machine sub-workflow with referencing the obtained IP address (1105).

Figure 12:
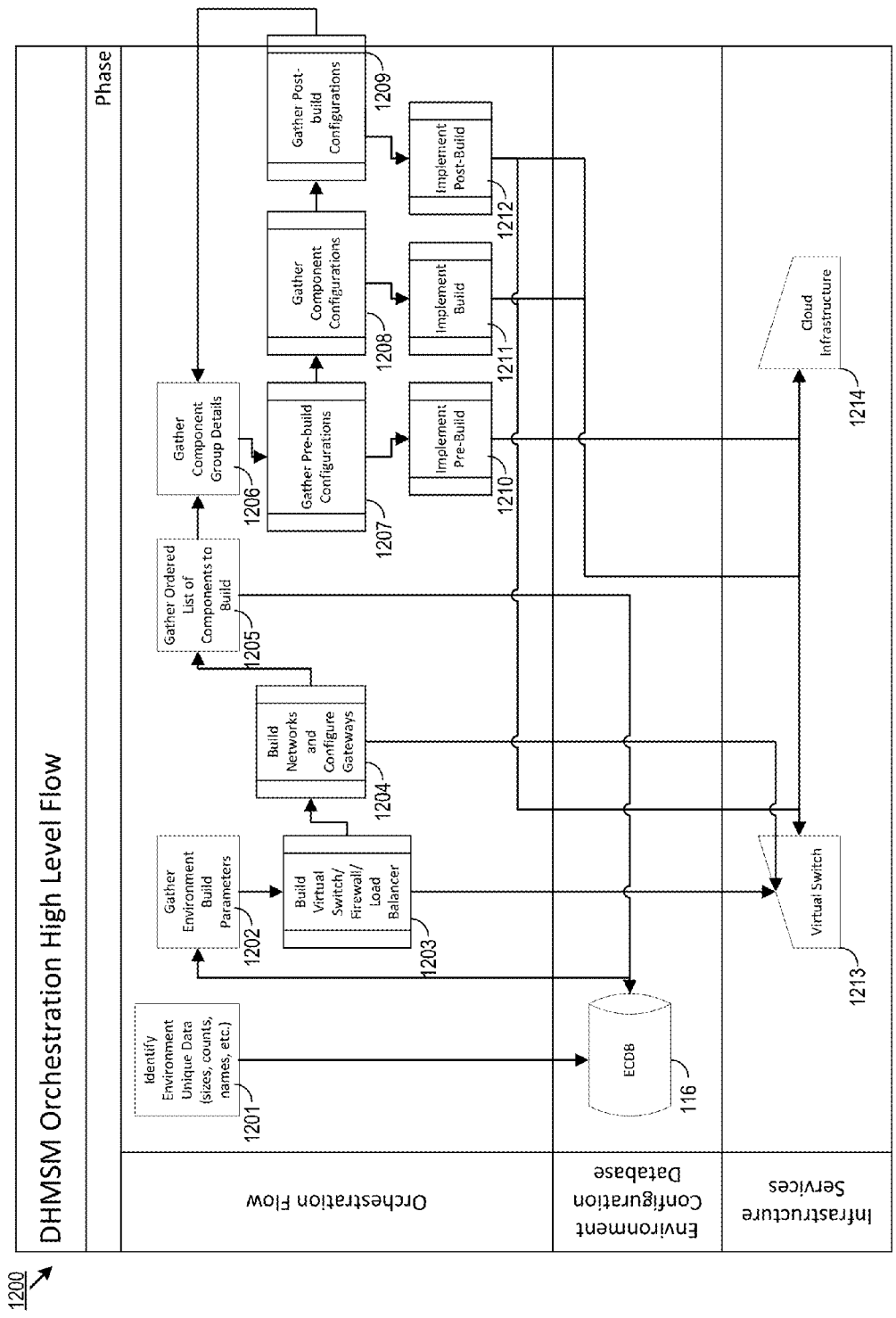
FIG. 12 shows a block diagram of the data defined infrastructure operating according to a logic flow within the global network architecture.

FIG. 12 illustrates a flow diagram 1200 of logic that describes an exemplary high level flow (e.g., wrapping workflow) of the DDI 112 interacting with various components of the global network architecture 100.

The DDI tool responsible for operating the DDI 112, may identify environment unique data (1201), which may be referenced as the "application fingerprint". The application fingerprint may include the requirements for achieving an operational goal. For example, the environment unique data may identify memory size requirements, number of virtual machines required, number of different databases, identification of other networks or components within the global network architecture 100, and services for achieving the operational goal. In a specific embodiment, the environment unique data/application fingerprint may identify that that three different virtual machines are needed that are running on three different networks, and a database server that includes 32 GB of memory and 8 different disks that are each 100 GB of memory. A user interface generated by the DDI tool (e.g., user interface 209) may provide the fields for a user (e.g., cloud system administrator) to input the environment unique data through the input/output interfaces 206 of the DDI 112.

The DDI tool may then transmit the application fingerprint to the ECDB 116. In response to receiving the environment unique data, the ECDB 116 may return additional application fingerprint environment build parameters that describe the processes and resource requirements to build the environment and components identified by the environment unique data for achieving the operational goal (1202). In the provided specific embodiment, the ECDB 116 may return the specific build parameters for building the three different virtual machines running on the three different networks and the database server having the specific characteristics. Based on the received environment build parameters, the wrapping workflow may be configured to understand an order in which to build the different components identified by the environment build parameters. The wrapping workflow may understand the order in which to build components based on predefined rules that are written into the wrapping workflow. For example, a rule may require virtual switches and IP addresses to be created before a virtual network so that the virtual network can be accessed and identified. Another rule may require virtual networks to be built before virtual machines so that the virtual machines have the network environment in which to run. In this way, the rules allow the wrapping workflow being run by the orchestration engine 118 to be self-sufficient such that the wrapping workflow may receive the environment build parameters from the ECDB 116, and create a build process order without additional inputs from a system administrator.

Therefore, the orchestration engine 118 running the wrapping workflow may implement a number of sub-workflow iterations within the wrapping workflow to achieve builds for each component identified within the environment build parameters. For example, one sub-workflow may build virtual switches, firewalls, and/or load balancers (1203). The virtual switches may be built by calling to a virtual switch 1213 (e.g., NSX virtual switch) within the infrastructure services layer being operated by the orchestration engine 118, where the virtual switch 1213 is a type of software defined infrastructure. Another exemplary sub-workflow may build networks and configure gateways (1204). By iterating through the different sub-workflows, the wrapping workflow may control the build of all the components for creating the virtual environment described in the environment build parameters.

Then, within this virtual environment, various different components may be built (e.g., web servers, Citrix servers) for ultimately achieving the recognized operational goal. For a given component group, the wrapping workflow may gather an ordered list of components to build for the given component group (1205). The wrapping workflow includes rules for understanding that a component group may require components to be built in a specific order, and in a specific way. In the specified embodiment, a component group may call for the build of a Citrix server. To build the Citrix server, the wrapping workflow may include rules for understanding the different components for building the Citrix server component group, and an order to build the different components to build the overall Citrix server component group. For example, building the Citrix server component group may first require the build of a license server and a front-end web server to support the build of the Citrix server.

The wrapping workflow may further gather component group details (1206). The component group details may identify certain desired requirements of the component group. For example, in the specified embodiment, the desired requirements may call for the Citrix server to support at least a certain number of predetermined users.

Then after gathering the ordered list of components to build (1205), and gathering the component group details (1206), the wrapping workflow may proceed through various processes for building the components that comprise the component group. The wrapping workflow may gather pre-build configurations for a component (1207), then implement the pre-build in according to the gathered pre-build configurations (1210). The implementation of the pre-build (1210) may initiate a call to a virtualization service such as, for example, cloud infrastructure 1214 (e.g., vSphere 6.0) running within the infrastructure service layer controlled by the orchestration engine 118.

The wrapping workflow may gather component configurations (1208), then implement build of the component accordingly (1211). The build implementation (1211) may initiate a call to the automation engine 120, where the automation engine 120 may be configured to automatically build the relevant component. For example, the automation engine 120 may implement a component build that modifies a virtual machine to operate as a web server based on gathered component configurations. The build implementation (1211) may be iterated to build each component identified in the component group.

The wrapping workflow may also gather post-build configurations (1209), then implement a post-build process accordingly (1212).

FIGS. 13-17 show exemplary database tables and database formats for data stored within the ECDB 116, including ASSET data and PAM data. According to some embodiments, the rules referenced by the wrapping workflow may be stored on the ECDB 116. The ECDB 116 may be understood to be a hierarchical data structure that describes an environment and/or operational goals to be achieved (e.g., built) by the DDI 112. The Environment table describes the environment or operational goal itself. The environment may contain one or more component groups. A component group is a set of systems that perform a single function. Examples would be web server or Citrix presentation server. Each component group is made up of components. A web server component group might only have a single component, such as a web server. A Citrix component group may have 4 components (e.g., license server[s], zone data collector server[s], storefront server[s], and session host server[s]). Each component may be made up of one or more virtual machines, described in the "VM_Requirement_xRef" table. Each VM may have one or more Storage Devices, File Systems, and NICs described in those tables. The component install table describes information required to execute the provisioning of the virtual machine and the installation/configuration of the component. For example, a software package may be installed as a specific user (e.g. "CitrixAdmin"). This user would be named in the "Run As" column of Component_Install. Additionally, each installation may require some amount of data that supports the installation, like IP addresses, names of related VMs, or Virtual IPs to assign. Each of these types of items may be described by data stored in the component_parameter table. FIGS. 16 and 17 depict the asset management tables that are written as the components are built to store the reserved information about each VM or component.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A system for building an environment according to a wrapping workflow, the system comprising:
   a communication interface configured to receive a build request identifying the environment;
   a database configured to store component build instructions;
   an orchestration engine configured to implement the wrapping workflow by:
   in response to receiving the build request, determining an operational goal for building the environment identified in the build request;
   retrieving component build instructions from the database based on the determined operational goal, wherein the component build instructions include instructions for building a plurality of component groups according to a component group sequence to achieve the determined operational goal;

determining a particular order of building the plurality of component groups to achieve the determined operational goal based on the component group sequence; and controlling a build engine to build the plurality of component groups in the particular order.

2. The system of claim 1, where the database comprises an environment configuration database and the build request comprises a cloud-resource build request for building a cloud-based resource.

3. The system of claim 2, where the system is configured to receive environment attribute information corresponding to the environment identified in the build request from the database as part of the cloud-resource build request.

4. The system of claim 3, where the system is configured to determined the operational goal responsive to a pre-determined characteristic of the cloud-resource build request.

5. The system of claim 1, where the build engine is configured to build the plurality of component groups in a managed environment.

6. The system of claim 1, where the build engine is configured to build the plurality of component groups in a cloud-deployed virtualized environment.

7. The system of claim 1, where the environment identified in the build request comprises a user-specified environment name.

8. The system of claim 7, where the orchestration engine is further configured to implement the wrapping workflow by:
   querying the database with the user-specified environment name to retrieve the component build instructions.

9. The system of claim 8, where the orchestration engine is further configured to implement the wrapping workflow by:
   querying the database with the user-specified environment name to determine the order of building the plurality of component groups.

10. The system of claim 1, wherein the orchestration engine is further configured to implement the wrapping workflow by:
    generating configuration items within a configuration management database (CMDB) describing the environment built according to the component build instructions.

11. A method for building an environment, the method comprising:
    receiving, through an interface, a build request identifying the environment;
    in response to receiving the build request, determining, by an orchestration engine, an operational goal for building the environment identified in the build request;
    retrieving component build instructions from a database based on the determined operational goal, wherein the component build instructions include instructions for building a plurality of component groups according to a component group sequence to achieve the determined operational goal;
    determining a particular order of building the plurality of component groups to achieve the determined operational goal based on the component group sequence; and
    controlling a build engine to build the plurality of component groups in the particular order.

12. The method of claim 11, where the database comprises an environment configuration database and the build request comprises a cloud-resource build request for building a cloud-based resource.

13. The method of claim 12, where environment attribute information corresponding to the environment identified in the build request is received from the database as part of the cloud-resource build request.

14. The method of claim 13, where determining the operational goal is responsive to a pre-determined characteristic of the cloud-resource build request.

15. The method of claim 11, where the build engine is configured to build the plurality of component groups in a managed environment.

16. The method of claim 11, where the build engine is configured to build the plurality of component groups in a cloud-deployed virtualized environment.

17. The method of claim 11, where the environment identified in the build request comprises a user-specified environment name.

18. The method of claim 17, further comprising:
    querying the database with the user-specified environment name to retrieve the component build instructions.

19. The method of claim 18, further comprising:
    querying the database with the user-specified environment name to determine the order of building the plurality of component groups.

20. The method of claim 11, further comprising:
    generating configuration items within a configuration management database CMDB describing the environment built according to the component build instructions.

* * * * *

UNITED STATES PATENT AND TRADEMARK OFFICE
CERTIFICATE OF CORRECTION

PATENT NO. : 9,614,781 B1
APPLICATION NO. : 15/201770
DATED : April 4, 2017
INVENTOR(S) : Aaron B. Goltzman et al.

Page 1 of 1

It is certified that error appears in the above-identified patent and that said Letters Patent is hereby corrected as shown below:

In the Specification

Column 15, Line 26, before "data. According to" replace "PAM" with --IPAM--.

Signed and Sealed this
Fifth Day of June, 2018

Andrei Iancu
*Director of the United States Patent and Trademark Office*